United States Patent [19]
Ashida et al.

[11] 3,970,380
[45] July 20, 1976

[54] FILM HANDLING SYSTEM EMPLOYING A COMMON CARTRIDGE

[75] Inventors: Akira Ashida, Tokyo; Kazuo Ishikawa, Kawasaki; Kiyoshi Takahashi, Kunitachi; Yoshio Komine, Tokyo; Kazuya Hosoe, Machida, all of Japan

[73] Assignee: Canon Kabushiki Kaisha, Tokyo, Japan

[22] Filed: May 29, 1974

[21] Appl. No.: 474,156

[30] Foreign Application Priority Data

| May 31, 1973 | Japan | 48-61685 |
| May 31, 1973 | Japan | 48-61686 |
| May 31, 1973 | Japan | 48-61687 |
| May 31, 1973 | Japan | 48-61688 |

[52] U.S. Cl. ............................. 352/130; 352/78 C
[51] Int. Cl.² .......................................... G03C 11/00
[58] Field of Search ................. 352/130, 78 C, 72

[56] References Cited
UNITED STATES PATENTS

| 3,422,740 | 1/1969 | Nerwin | 352/78 C X |
| 3,666,361 | 5/1972 | Pankow | 352/78 C |
| 3,778,140 | 12/1973 | Land | 352/130 |
| 3,800,306 | 3/1974 | Land | 352/130 X |
| 3,832,048 | 8/1974 | Batter | 352/130 |

Primary Examiner—Monroe H. Hayes
Attorney, Agent, or Firm—Toren, McGeady and Stanger

[57] ABSTRACT

A film handling system to with which a film cartridge is commonly usable in each step of exposure, processing (developing) and projection of the film housed therein, wherein a safety means which advances the above mentioned film cartridge through each step in which it is used in a prescribed sequence is provided. Further an electric circuit which controls the above mentioned handling system in such manner as to activate said system according to the output of the safety means is provided so that such erroneous handling as occurs when processing or projecting unexposed film by mistake or by projecting unprocessed film can be automatically prevented.

36 Claims, 48 Drawing Figures

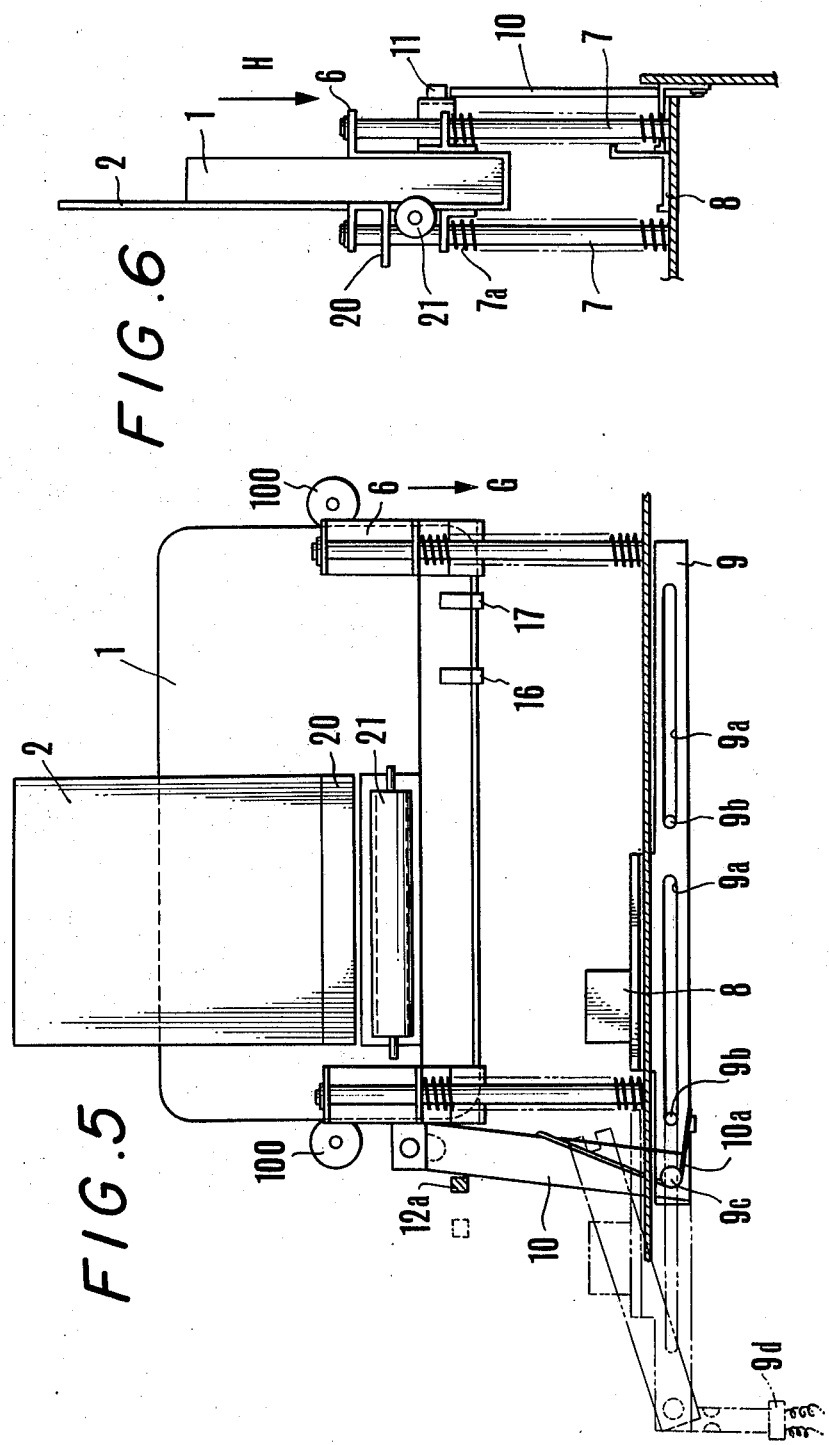

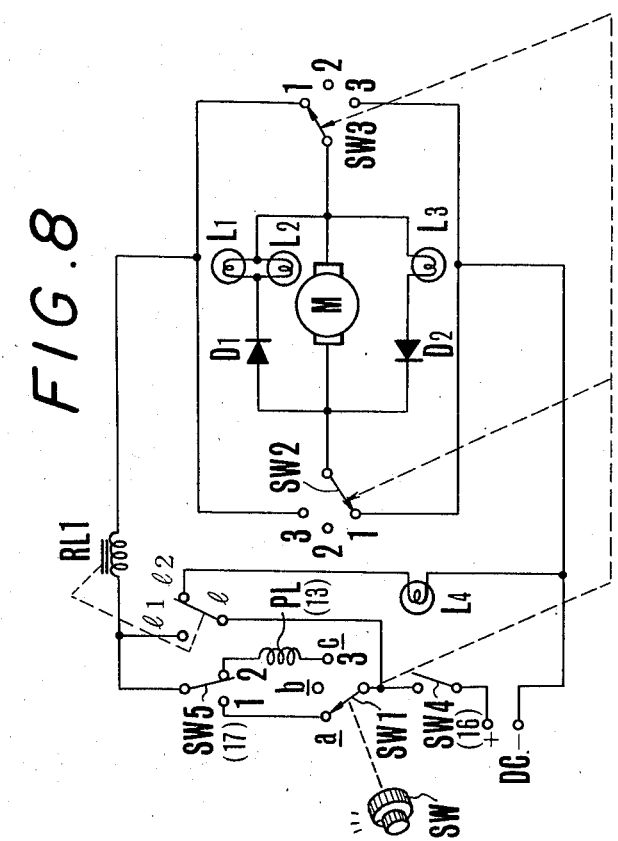
FIG.8
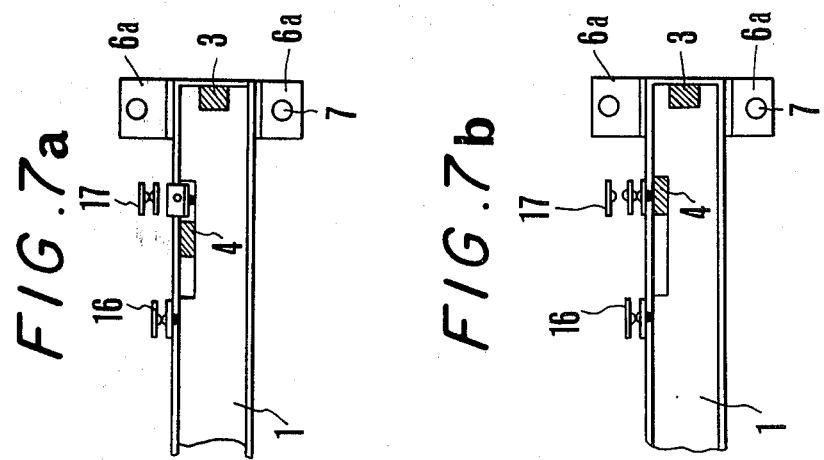
FIG.7a
FIG.7b

FIG. 19
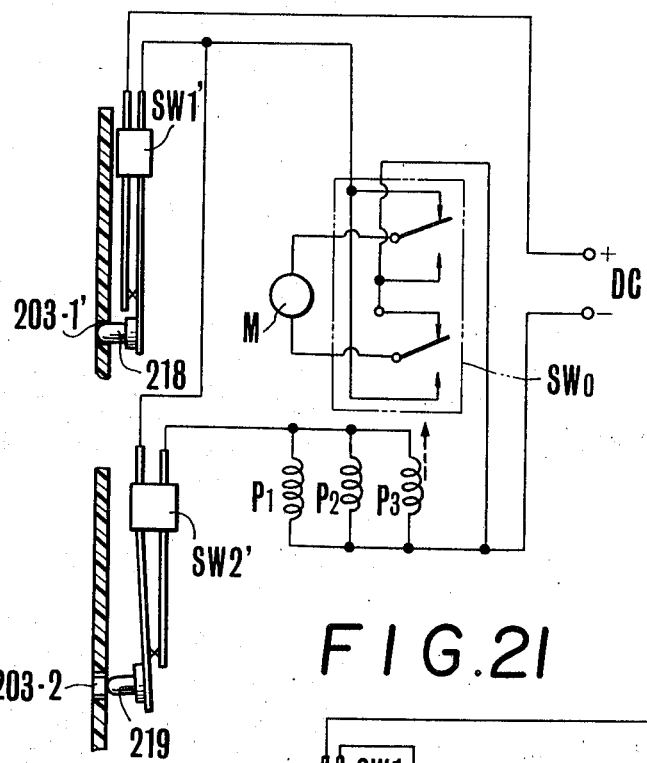
FIG. 20
FIG. 21
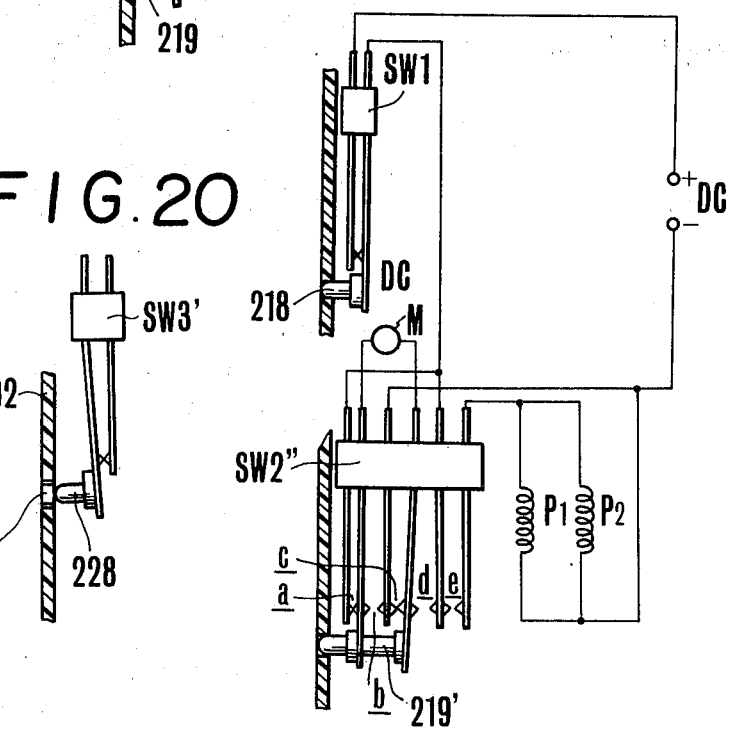

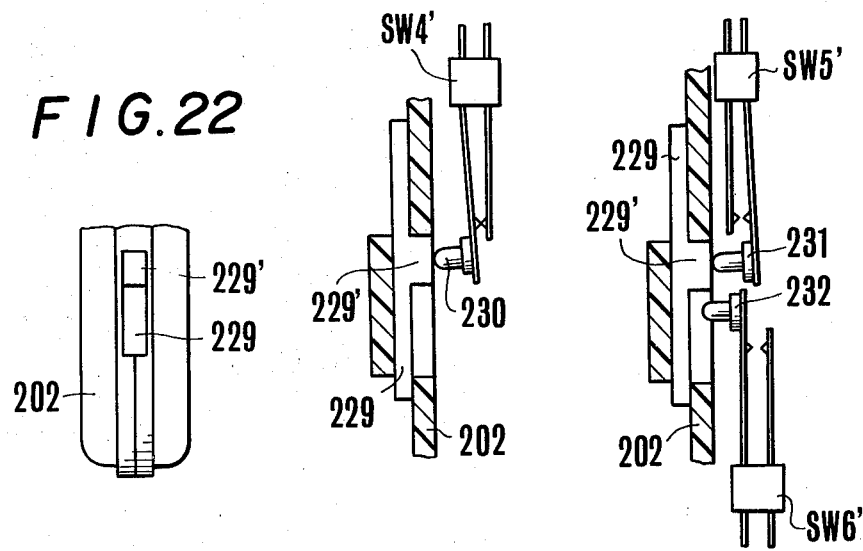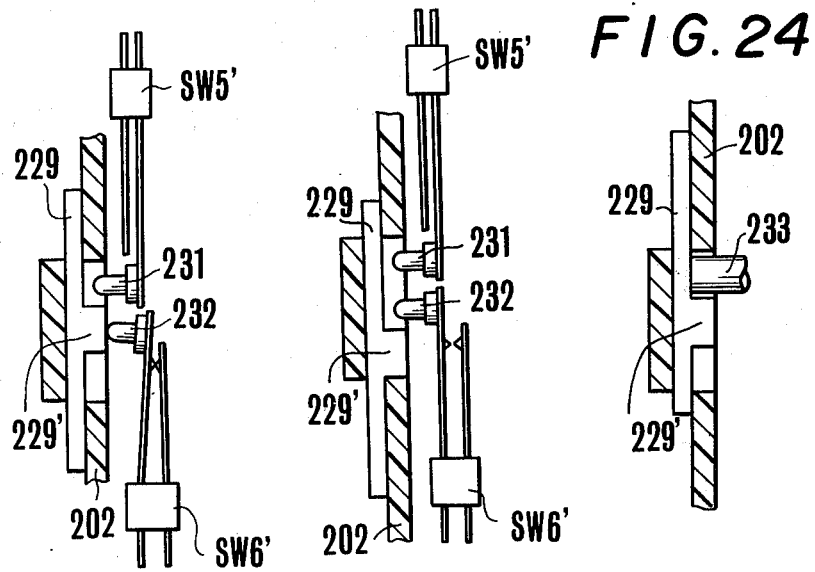

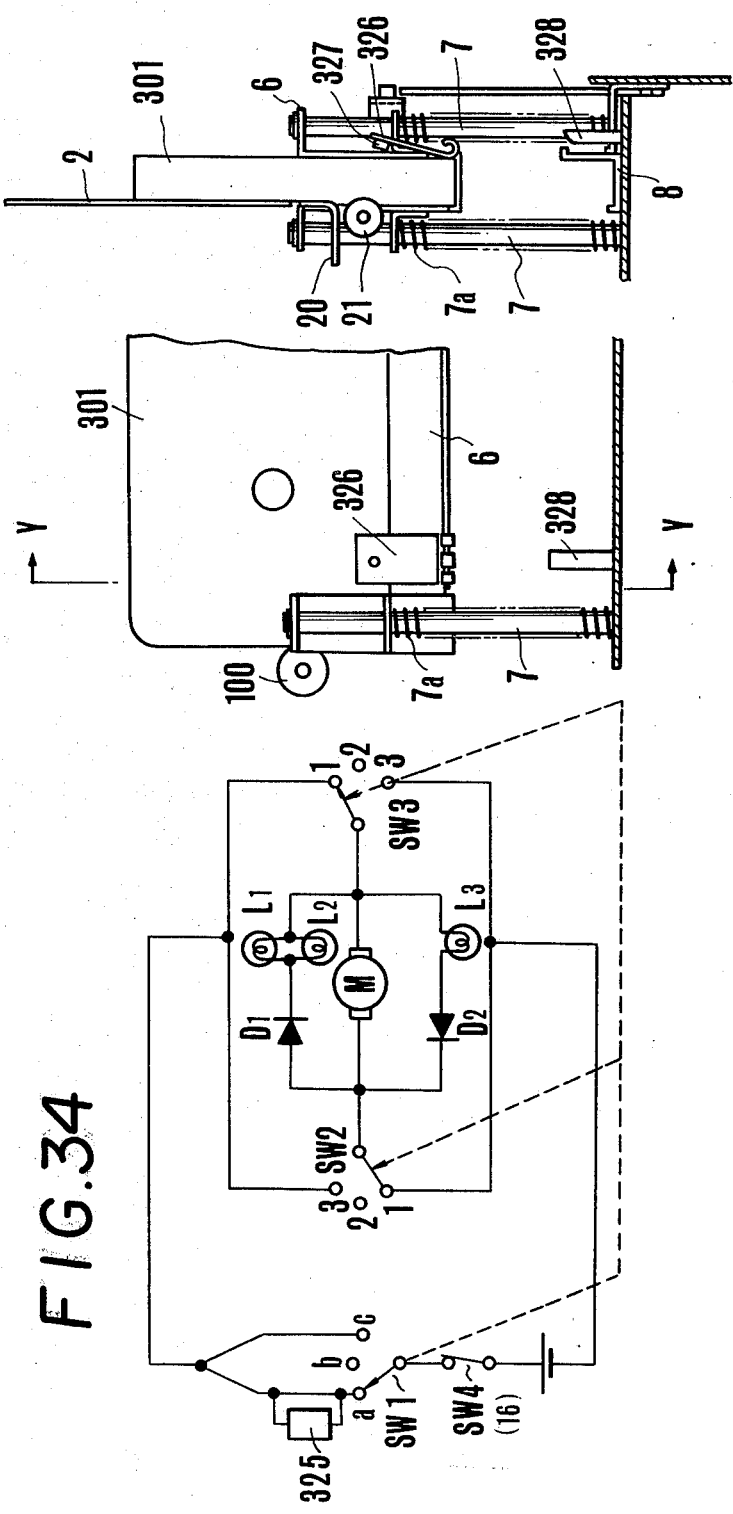

FILM HANDLING SYSTEM EMPLOYING A COMMON CARTRIDGE

BACKGROUND OF THE INVENTON

1. Field of the Invention

The present invention relates to a film handling system provided with a safety means to advance a film properly following the prescribed sequence through each step of exposure, processing and projection of said film using one common film containing cartridge.

2. Description of the Prior Art

It has been widely accepted recently in the field of small size motion picture to load film into a camera and photographing is then accomplished. After photographing, exposed film is processed while the cartridge is kept in a camera or is moved to another device. Subsequently, the processed film is projected with a projector.

In a system for using a conventionally sold film cartridge, such typical use is that the film with which photographing is finished is sent to a prescribed developing factory where the developed film is wound on a separate reel from said cartridge, then it is sent back to the photographer either as it is or is housed in a cartridge for projection. The photographer projects the same to enjoy the same. One shortcoming in such conventional way of use is that the photographer can not develop and project the film immediately after photographing.

In a still camera in order to overcome said conventional shortcoming, technique has already been used such that a film is subjected to a developing process immediately after photographing with a camera and said developing process is completed in a camera within a short period of time thus the picture which has just been photographed can be seen. As the film after photographing is of a considerable length with a large volume in the field of small size motion picture, it has been difficult to have so-called instant developing in a simple manner as in a still camera. However, such technique has been proposed lately that a long film is housed compactly in a cartridge and said cartridge is used as it is in photographing, developing and projection so that instant developing and instant projection can be done. Such technique has been proposed by the U.S. Pat. No. 3,644,024, and 3,604,790, etc. That developing liquid is stored in a cartridge which houses film, and after all of the film is exposed, the developing liquid storage chamber within a cartridge is broken to coat the film with the developing liquid for instant developing process. Also, concerning instant developing and instant projection, such technique has recently been proposed that the above mentioned cartridge which houses film and developing liquid is mounted in a movie projection unit so that the film is dried after instant developing and is transferred to projection step.

By such technique, advantages are such that the entire process from photographing to projection can be done in a remarkably short period of time compared to conventional technique, which tends to increase the number of camera users either in a still camera or a motion picture camera. As a camera and a projector are widely spread and the range of their users is expanded, it becomes necessary to secure conveniences in handling. Therefore, for preventing erroneous handling by anyone, it is necessary to provide such means in a mechanism of a camera or a projector to prevent erroneous functioning even if a user makes erroneous handling.

SUMMARY OF THE PRESENT INVENTION

An object of the present invention is to provide a film handling system, for responding to the above mentioned requirement, having a safety means to advance film properly following a prescribed sequence through each step of exposure, processing and projection using one common film cartridge containing a roll of film therein.

Another object of the present invention is to provide a film handling system having a means being equipped at the film or at the film cartridge to detect identification signals for indicating non-exposure or exposure-finish of film and a safety means to allow exposure function in a photographing step when the film used has not been exposed by the output of the former means and to automatically prevent exposure function in the photographing step when the film used has already been exposed.

Still another object of the present invention is to provide a film handling system having a means equipped at the film or the film cartridge to detect identification signal for indicating whether the film is before exposure or after exposure or after completion of processing step, and a safety means to allow processing operation in the processing step when film is after exposure, and to automatically prevent processing operation in the processing step when the film is before exposure or after processing, in a combined function with the former means.

Further, another object of the present invention is to provide a film handling system having a means being equipped at the film or the film cartridge to detect identification for indicating whether the film is before exposure or after processing, and a safety means to allow projection in the projection step when the film has processing completed and to automatically prevent projection function in the projection step when the film is before exposure or before processing, by the output of the former means.

Still another object of the present invention is to provide a film handling system having an information indication means at a film cartridge which is commonly used in each stage of photographing, processing and projection to indicate which one of said step the film housed therein is, and employing such film cartridge.

Other objects and characteristics of the present invention will become apparent from the detailed explanations of the present invention which are to be given in reference with the drawings.

BRIEF DESCRIPTION OF THE DRAWINGS

FIG. 5 is a front elevation of the system shown in FIG. 4.

FIG. 6 is a side elevation of the system shown in FIG. 4.

FIG. 7(a) and (b) is a plan to show an example of a means to identify the identification signal of the film cartridge shown in FIG. 1 in the system shown in FIGS. 4, 5 and 6.

FIG. 8 is a circuit diagram to show an example of an electric circuit connection which can be applied to the system shown in FIG. 4 to FIG. 7.

FIG. 19 is a circuit diagram to show an examle of an electric circuit connection which can be applied to the film handling system shown in FIG. 12 to FIG. 18.

FIG. 20 is a front elevation of an example of a switching means which can detect the identification signal provided by the film cartridge.

FIG. 21 is an electric circuit connection diagram which is made by modifying the circuit shown in FIG. 19.

FIG. 22 is a partial side elevation of the film cartridge in which a shiftable member is used as an identification signal providing member.

FIG. 23(a) to (d) are front elevations of a means to detect the identification signal providing member shown in FIG. 22 in various manner.

FIG. 24 is a front elevation to show other example of a detection means which is made by modifying the detection means shown in FIG. 23.

FIG. 34 is a circuit diagram to show an example of an electric circuit connection which can be applied to the handling system shown in FIG. 32 and FIG. 33.

FIG. 35 is a partial front elevation of a handling system which is made by modifying the system shown in FIG. 32 and FIG. 33.

FIG. 36 is a partial cross sectional view in which the system shown in FIG. 35 is sectioned along the line X — X and viewed in the direction of arrow.

DESCRIPTION OF THE PREFERRED EMBODIMENTS

Figure 1:
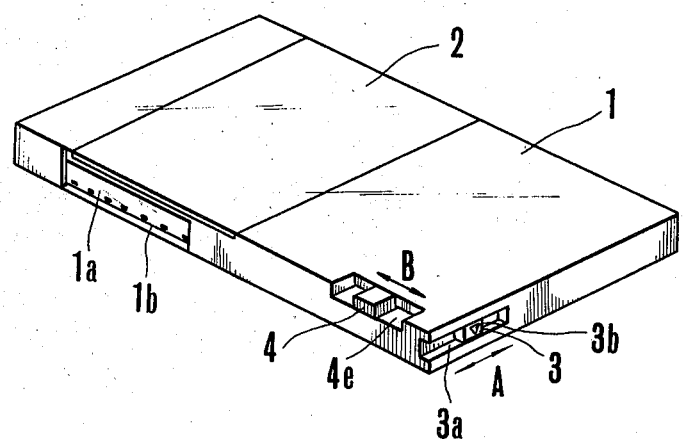
FIG. 1 is an oblique view of one example of a film cartridge which can be applied to a film handling system of the present invention.
Figure 2:
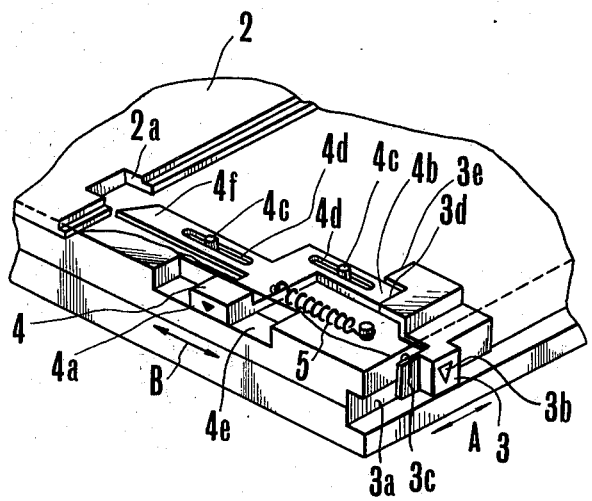
FIG. 2 is a partially broken oblique view showing an important part of an identification signal providing means equipped at the film cartridge shown in FIG. 1.

FIG. 1 is an oblique view of a film housing cassette which can be used commonly at least for processing and projection, and has identification signals to indicate whether said film has already been exposed or has its processing operation completed. In the drawing, 1 is a housing of the above mentioned film cartridge which can be used commonly, and projection apertures 1b are provided at sides of the cartridge for placing the film 1a in projection use. 2 is a protective cover which can be moved and has a function of outside wall of the cartridge, and it is positioned at a developing liquid storage part. Movable members 3, 4 to provide the above mentioned signals are seen in the external surface of said cartridge and the inside mechanism of said members is shown in an enlargement in FIG. 2. The movable member 3 is provided in such manner as movable within a groove part 3a provided at the external wall of the film cartridge in a direction of an arrow A in the drawing and has an indication mark 3b to indicate its position. This movable member 3 has at least three steps of engaging planes which engage with the movable member 4, and said planes are shown as 3c, 3d, 3e which give the movable member 4 such lift as will move the member 4 one step each in its moving direction, that is the direction B shown in the drawing. The movable member 4 has a signal part 4a to enable the same to indicate its moved position to outside of the cartridge and has an end part 4b which can engage with the above mentioned engaging planes 3c to 3e, and is always biased to such direction as engaging with the above mentioned engaging planes 3c to 3e by a spring 5. Said movable member 4 has its movement guided by a pin 4c and a slot 4d. The movable member 4 slides within an indented part 4e provided at an outside wall of the cartridge, and a front end claw shape part 4f is provided so that it is inserted into an indented groove 2a provided at the above mentioned protective cover 2 at such position that the amount of said sliding becomes greatest against the spring 5.

Figure 3A:
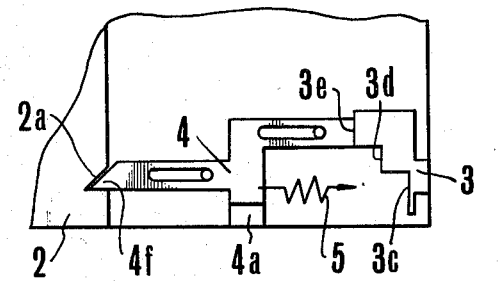
FIG. 3(a) to (c) are plans to show respectively different positions of the identification signal providing means of the film cartridge shown in FIG. 2.

Now, explanations will be made on the state of use in each step of said film cartridge. FIG. 3(a) is to show the state of film cartridge which contains a roll of film before photographing, that is, before exposure, wherein the movable member 4 is located at the extreme left position in the drawing and engages with the indented part 2a of the protective cover 2 of the cartridge. Therefore even if this cartridge containing unexposed film is mounted to the developing device, the protective cover 2 of the processing liquid storage chamber cannot be shifted thus film processing can not be done.

Figure 3B:
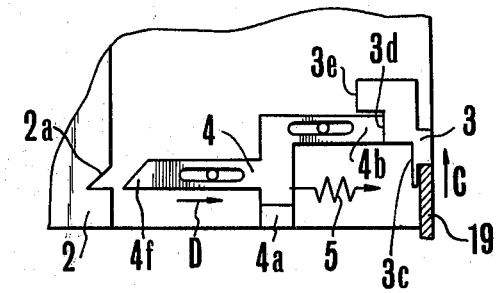

FIG. 3(b) is the drawing to show the state wherein the above mentioned film cartridge containing unexposed film is mounted in a projection device. Preferably when said cartridge is mounted in the projection device by an activating member 19 in a protruding shape provided at said projection device, the above mentioned movable member 3 is shifted one step to the direction of arrow C shown in the drawing. By this, the engaging end part 4b of the above mentioned movable member 4 is slid from the engaging plane 3e to the engaging plane 3d by the elastic power of the spring 5, and the movable member 4 is shifted to the direction D in the drawing as much as said shifting, while the claw shape front end part 4f comes off the indented part 2a of the protective cover 2.

Figure 3C:
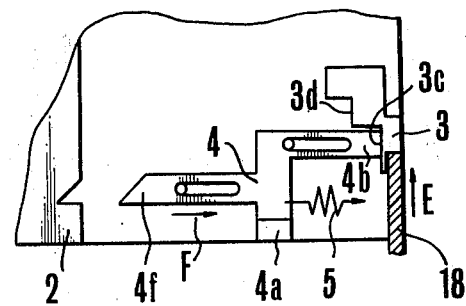

FIG. 3(c) shows the state wherein the film cartridge, the film in which has photographing completed, is mounted into a device in which film processing can be done. When the above mentioned cartridge is mounted into said device the above mentioned movable member 3 is further shifted one step to the direction E in the drawing by an activating member 18 in protruding shape provided at said device side as will be described below. By this, the above mentioned engaging end part 4b of the movable member 4 slides from the engaging plate 3c by the elastic power of the spring 5 to the engaging plane 3c and the movable member 4 is shifted to the direction F shown in the drawing as much as the amount of said shifting (sliding), while the claw shape front end part 4f is shifted to such position as completely comes off the indented part 2a of the protective cover 2. At this time, the drawing shows that the indication part 4a is located at the extreme right end in the indented groove 4e of the cartridge, that is the projection position. Thus it is desirable that the movable members 3, 4 which are provided at the film cartridge 1 and give identification signals are stopped at each prescribed position by a well known clock mechanism. FIG. 3(a) shows the film cartridge in a non-exposed state, and FIG. 5(b) shows the film cartridge which has exposure completed, while the FIG. 5(c) shows the state of the film cartridge which has completed projection. And when film processing is done using a film processing means provided at the projection device, the film processing can be done in the state of FIG. 5(b) or FIG. 5(c).

Figure 4:
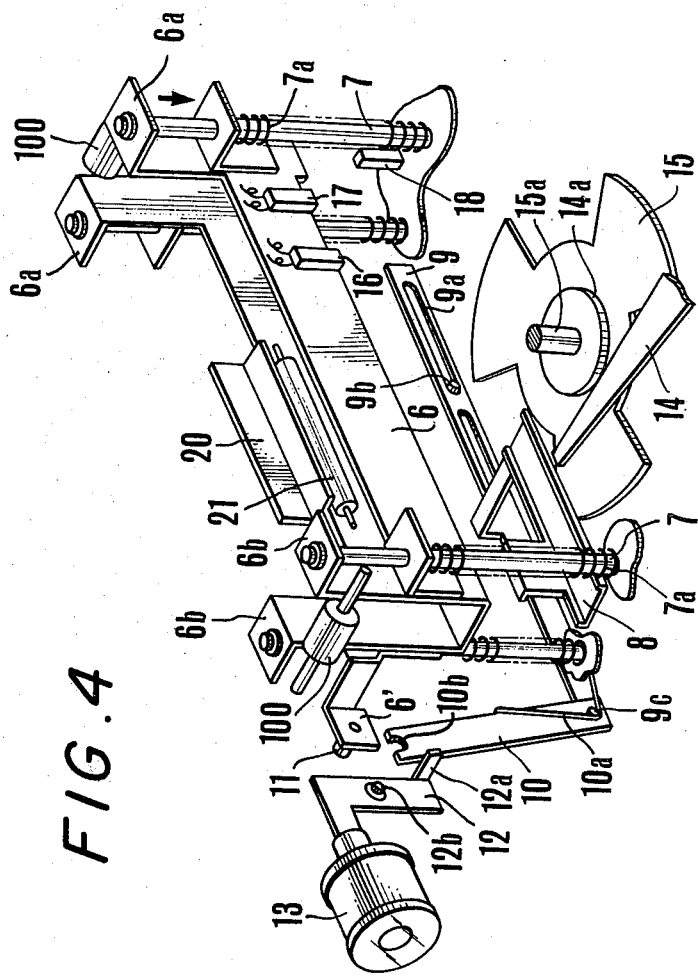
FIG. 4 is an oblique view of an important part of one example of the handling system according to the present invention.

FIG. 4, FIG. 5 and FIG. 6 are to show make up of important parts of a projection device in which a film cartridge containing film after exposure is mounted in a projection device as a film handling system, and after film processing is done first, the film cartridge is shifted to projection stage. FIG. 4 is an oblique view of said important part, FIG. 5 is its front elevation, and FIG. 6 is its side elevation. In the drawings a cartridge housing frame 6 has a cross-section of V-shape and is formed to enable it is receive the cartridge housing 1 (refer to FIG. 1), so that it is so supported as being shiftable along a guide bar 7 at supporting parts 6a, 6b at left and right end parts. 6' Is a projection part which is integral with the housing frame 6 and carries a pin 11. The guide bar 7 is fixed at a projector main body and a coil spring 7a is spanned between the same and the supporting part of the end part of the above mentioned housing frame, wherein the above mentioned housing frame 6 is shifted downward in the drawing against the elasticity of said spring. 100 Is a roller for determining left and right position when the film cartridge is mounted in the housing frame 6, and is rotatably supported at the main body. 8 Is a light shielding member to cover projection use apertures of the cartridge 1 at the time of film processing step, and is integrally formed with a sliding lever 9. A slot 9a is perforatedly provided at said sliding lever 9 and engages with a pin 9b which is fixed at the main body. A rotating lever 10 which is axially supported in a rotatable manner by a pin 9c at the left end part of said sliding lever 9 in such shape as standing up from said sliding lever 9, and is biased to counterclockwise direction by a spring 10a in the drawings 4 and 5. An indented groove 10b which can be engaged with the above mentioned pin 11 is provided at the upper end of the rotation lever 10. A selection lever 12 having a contacting piece 12a which rotates said rotation lever 10 in a direction reverse to. The spring biased direction is axially supported at an axle 12b which is fixed to a main body for controlling the position of the lever 10, while the other end of the lever 12 is connected to an operating steel piece of an electro-magnetic plunger 13. This plunger 13 has its action and non-action controlled by an electric circuit to be described below depending on whether there is a detection signal or not from switches 16, 17 being provided at the film cartridge to detect the above mentioned identification signal.

18 Is the activation member provided at the main body of the projection device and has been described previously in FIG. 3(c). 20 Is a member to open the protective cover 2 of the processing liquid storage chamber of the film cartridge 1 and is fixed to the main body of the projection device, while a film-processing-liquid-push-out-roller 21 which is supported rotatably on the main body is provided under said member 20 to push out the film processing liquid after the protective cover 2 is opened from the storage chamber to send to same to the film processing part within the cartridge. Such film cartridge as having film processing liquid by which instant film processing can be done and such sending function of the film processing liquid contained in the film processing device to the film plane are described for example in the U.S. Pat. Nos. 3,687,051, 3,641,909, etc., and now such method and device can be utilized.

In FIG. 4, a film advancing claw 14 of projection device, a cam 14a to intermittently send said claw in a conventionally known manner, a rotation axle 15a which is rotated by a driving means not shown in the drawing for rotating said cam, and a shutter blade 15 which is integrally attached to said axle 15a are shown. The make-up of the above mentioned switch members 16 and 17 and their positions are shown in FIG. 7(a)(b). The switch 16 is closed when the film cartridge is mounted within the housing frame prescribed within the projection device while switch 17 is a switching means to detect the position of the movable member 4 which indicates the state of film within said cartridge.

Such switching means constitute a part of such safety device as preventing erroneous processing of unexposed film and erroneous projecting unprocessed film. An electric circuit diagram applied to such safety device will be explained referring to FIG. 8. The switches 16, 17 shown in FIG. 4 and FIG. 5 correspond to switches SW4, SW5 in FIG. 8, respectively. A switch SW1 is a selection switch and is linked with the selection operation by an operation knob SW which can be operated from outside of the projection device, that is the change over operation of "film processing", "projection", "off" and the change over contact a corresponds to film processing, and the contact b corresponds to off, while the contact c corresponds to projection. Switches SW2, SW3 are switches to change over positive and negative of the current of a motor driving circuit, and are changed over in an association with the change over action, film processing, projection, of the switch SW1. A relay $RL_1$ is to place the switch SW5 in a self-lock position, and connects a relay switch $l$ to a contact $l_1$ at the time of its operation. A projection lamp $L_1$ and a pilot lamp $L_2$ to show the state of projection are connected in parallel, while $L_3$ is a lamp to show the state of film processing, wherein these lamps are connected to direct current power source through diodes $D_1$, $D_2$, respectively. $L_4$ is a lamp which is lighted to give warning when an unexposed roll of film is loaded by mistake as film processing is gone. 1 is a motor to drive film at the time of film processing and projection.

Next, explanations will be made on the function of a safety means, in a projection device having above mentioned set-up, which allows projection when the film has processing completed and automatically prevents projection when the film has not been exposed or processed, depending on the output of a switching means to detect the state of film within the film cartridge.

[Action to allow projection when the film has processing completed]:

The projection device is set at projection made by the change over knob SW and the switch SW1 is changed over and connected to the contact C in an association therewith. In an association with it the change over switches SW2, SW3 for positive and negative rotation of the motor M are connected to their positive rotation position 1. In a film cartridge in which film processing is completed, the movable members 3, 4 are positioned at the places shown in FIG. 3c regardless of the location of film processing. When it is mounted in a projection device in the direction of arrow H of FIG. 6, as said cartridge is first set at the cartridge housing frame 6, since the movable member 4 is at such positional relationship as shown in FIG. 7b, the switch 16 (SW4) is closed and the switch 17 (SW5) is connected with the contact 2, therefore the plunger PL (corresponding to 13 in FIG. 4) is activated and at the same time the relay $RL_1$ is activated to change over and connect the relay switch $l$ to the contact $l_1$, thus the circuit of the warning lamp $L_4$ is opened. By the action of the plunger PL (13) the selection lever 12 which is coupled with the operation steel piece in FIG. 4 is rotated around a fulcrum 12b in the drawing to counter clockwise direction and pushes the rotation lever 10 with its protruding part 12a to rotate the same to clockwise direction. The position of the protruding part 12a and the rotation lever 10 at this time is well shown in FIG. 5. At this time as the film cartridge 1 is advanced together with its housing frame to the direction G, the pin 11 which is integral with the housing frame engages with the indented groove 10b at the upper part of the rotation lever and when H-direction mounting of the cartridge is completed, the above mentioned rotation lever 10 reaches the position shown by broken line of FIG. 5, and the sliding lever 9, which is coupled therewith by a pin 9c, is slid to its extremely left position by the engagement between the pin 9b and the slot 9a so that the light shielding member 8 which is integral with said lever is evacuated from the position facing the apertures for projection of the cartridge 1 to the position shown by broken line in FIG. 5. As such mounting of the cartridge 1 into the prescribed projection position is completed, for cutting out the plunger circuit, a switch 9d, which is opened by such sliding member 9 as shown in FIG. 5 to indicate that the cartridge reaches said completion position, is inserted in series between the plunger PL in FIG. 8 and the contact 2 of the SW5, and by this current to the plunger PL (13) is stopped after the cartridge is mounted for preventing waste of electricity. On the other hand an electric circuit is formed from the positive terminal of power source — switch SW4 — relay contact $l_1$ — relay $RL_1$ — switch SW3 (contact 1) — motor M — switch SW2 (contact 1) — negative terminal of power source, thus the motor M starts positive rotation. By this the film advancing claw 14 is activated and the shutter 15 is rotated thus ordinary projection is done.

[Action to prevent projection when the film has not been processed]:

As the projection device is set at the projection mode, the switch SW1 is connected to the contact C. The movable members 3, 4 which give the identification signals of the cartridge 1 which contains undeveloped film are at the position of FIG. 3a in case the film is not exposed, while they are at the position of FIG. 3b in case the film is exposed but not processed yet. When this cartridge is mounted in a projection device, since the switch 16 (SW4) is closed as shown in FIG. 7a when it is first mounted in the cartridge housing frame, and the switch 17 (SW5) is at the position of the contact 1, current does not flow to the plunger PL and the relay $PL_1$ will not be activated, no electricity is supplied to the motor M, and on the other hand the circuit of the warning lamp $L_4$ is formed to secure warning lighting. By this the photographer will notice his erroneous handling. Especially in the case of the cartridge containing non-exposed film since the front end claw part 4f of the movable member 4 is engaged with the indented part 2a of the protective cover 2 of the cartridge, even if the user tries to mount the cartridge in the projection device forcibly, the protective cover will not be opened, thus film processing liquid will not come out in error. Also when the cartridge containing unprocessed film after being exposed is mounted to the projection device disregarding the warning, the plunger PL (13) will not work thus the light shielding member 8 will not retreat so that the light from projection apertures is prevented from inadvertently entering into the cartridge.

Next, explanations will be made on the handling at the time when the cartridge containing film which has been exposed by a camera, etc. is mounted in the above mentioned projection device and first film processing is done then the user proceeds to projection.

Since the projection device is changed over to "projection mode", the switch SW1 is connected to the contact a, and the switches SW2, SW3 are changed over to inverse rotation side that is to the contact 3. The movable member 3, 4 of the cartridge containing film after exposure are at the positions shown in FIG. 3b and as this cartridge is mounted in the device which serves both for film processing and for projection, as shown in FIG. 7a the switch 16 (SW4) is closed, on the other hand the switch 17 (SW5) is connected with the contact 1. As the relay $RL_1$ is activated by this to change over the relay switch $l$ to the contact $l_1$ side, the warning lamp $L_4$ is not lighted. Also the motor M is energized and film advancing for processing is done (to the direction reverse to that for projection) and it is indicated by the lamp $L_3$ that the film is in processing state. When the protective cover 2 is opened and film processing, which is done with the aid of the roller 21 by using the processing liquid in such manner as described in the U.S. Pat. No. 3,644,024, is completed, next stage of projection can be done using the same device. At this time the switch SW1 is changed over to the contact C, while the switches SW2, SW3 are changed over to the contact 1 side, respectively, by mode change over.

It is possible to have the switch SW5 detect the completion of film processing and changed over to the contact 2 side, also when the cartridge is mounted in the film processing and projection device the movable members 3, 4 may be shifted by the operation member 18 at the device side when the mounting is completed as mentioned previously, and by this the switch 17 (SW5) may be changed over to the contact 2 side as shown in FIG. 7b. The relay $RL_1$ is to self lock the motor driving circuit regardless of change over of the switch SW5 in the latter case.

Thus, the plunger PL (13) is activated and as mentioned above the light shielding member is evacuated at the same time as the mounting of cartridge in the device, opening the projection apertures and the film advancing is started through the film advancing claw by the driving of motor M, thus ordinary projection is done.

The reason for making the rotating direction of the motor M in the above mentioned film processing and projection stage to the inverse direction, is that when a film cartridge of two axles type is used if exposure (photographing) is done first in positive direction film advancing, next film processing is done in the step of rewinding the same, then projection of film is done in the second positive direction film advancing, the handling can be done conveniently.

Figure 9:
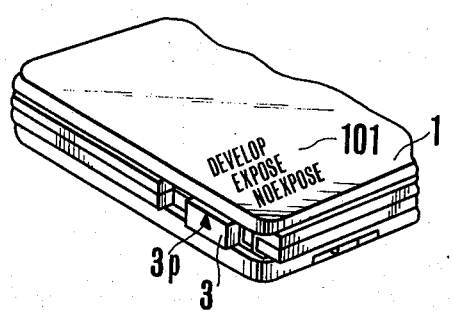
FIG. 9 is a partial oblique view to show an example of a film cartridge provided with an information indication means which has the above mentioned identification signal also allows visual identification.

As has been explained above in detail, the above mentioned film cartridge can be used commonly for three steps of exposure, film processing and projection. At this time it is convenient to provide some visual indication on the movable members equipped at the cartridge. Therefore as shown in FIG. 9, an arrow mark 3P is provided at a part of the movable member 3 and an indication part 101 clearly showing each step of unexposed, exposed, film processed, at the cartridge housing side so that erroneous handling can be prevented visually.

Figure 10:
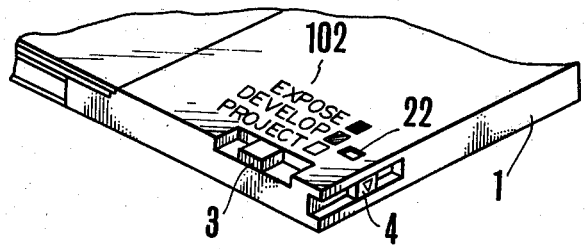
FIG. 10 is an oblique view to show other modified example of the film cartridge shown in FIG. 9.
Figure 11:
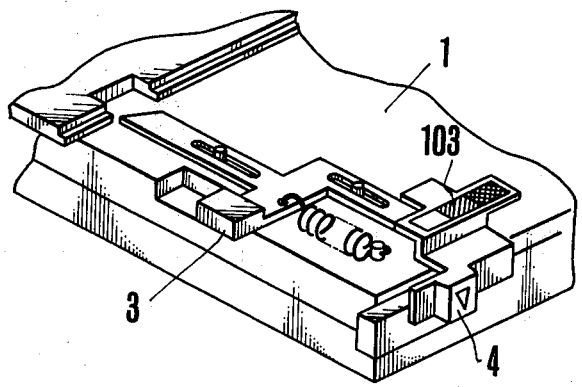
FIG. 11 is a partially broken enlarged oblique view of the film cartridge shown in FIG. 10.

Also as other embodiment of the present invention it is possible, as shown in FIG. 10 and FIG. 11, that indication parts 102, 103 clearly showing three kinds of letters, colors and/or, marks, etc. corresponding to the above mentioned steps are provided at a part of the movable member 3, so that they can be seen through an indication window 22 provided at the cartridge main body.

Figure 12:
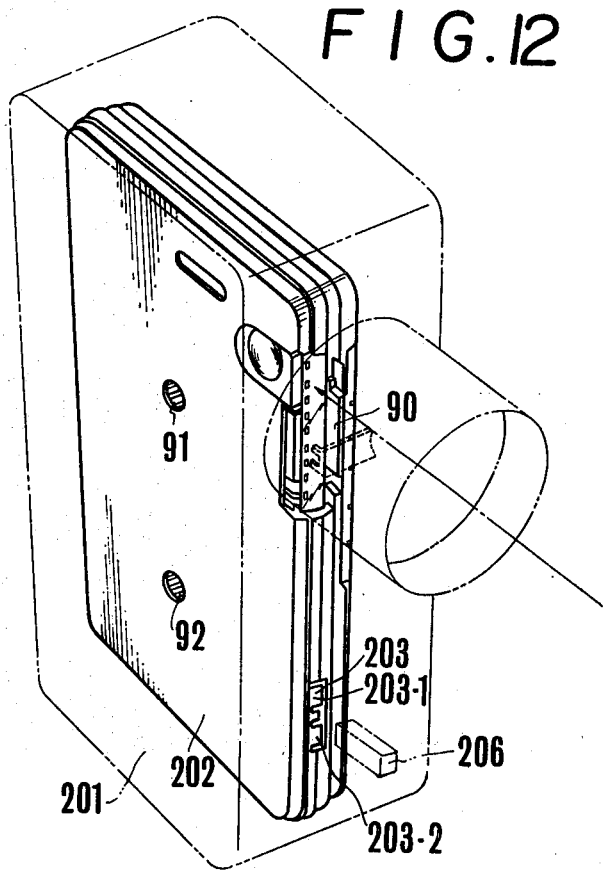
FIG. 12 is an oblique view to show the step in which a film cartridge with further modification is mounted into a motion picture camera and is being exposed.
Figure 14:
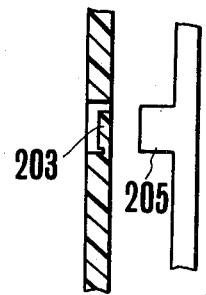
FIG. 14 is a partial enlarged cross sectional view of an identification signal providing part and its detection part of the film cartridge shown in FIG. 12 and FIG. 13.
Figure 13:
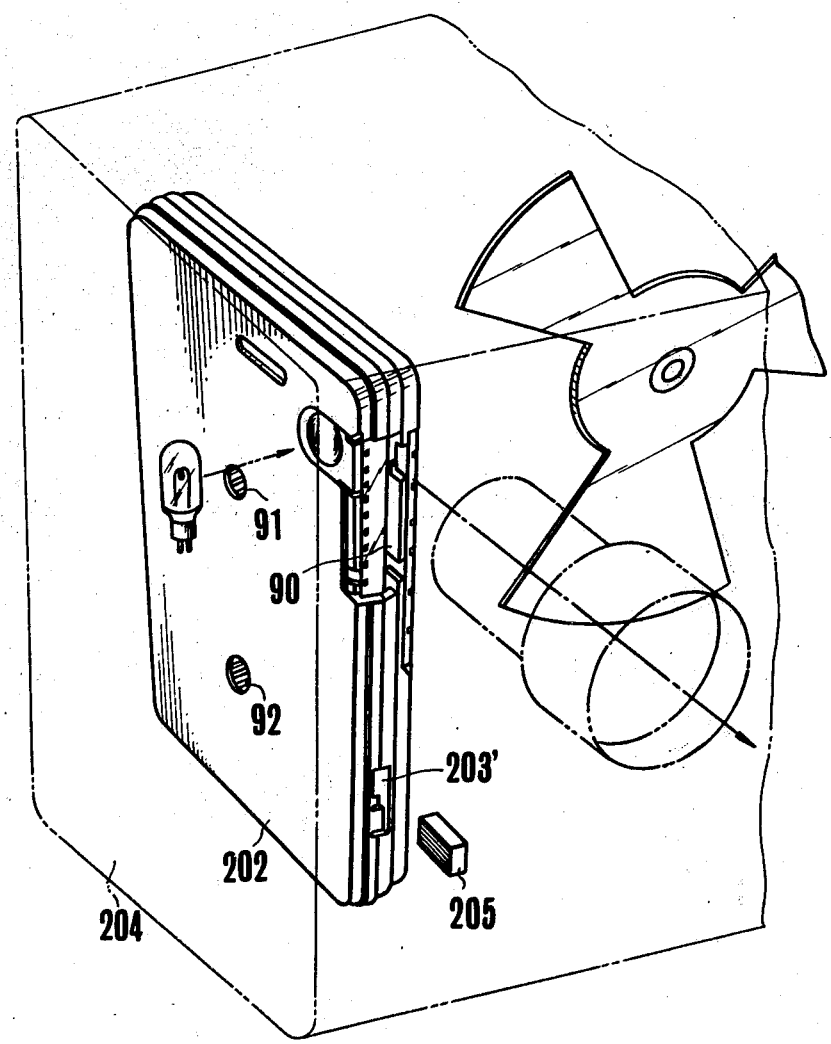
FIG. 13 is an oblique view to show the state in which the film cartridge shown in FIG. 12 is, after being used in photographing in a camera, mounted into a motion picture projection device and now is being projected.

FIG. 12 to FIG. 14 are to show other embodiment of the identification signals provided at the film cartridge to indicate unexposed, or film processing completed state of the film. The cartridge 202 containing film has a notch claw 203. After this film cartridge is mounted to a camera and ordinary photographing (exposure) is done, this claw 203 is notched by hand or by other means to indicate completion of exposure.

When such cartridge is mounted in a projection device 204, the projection part 205 provided at the projection device 204 side for detecting notch can go through the above mentioned notch hole 203', thus the cartridge 2 can be properly mounted in the projection device. FIG. 14 shows details of the notch claw 203. The above mentioned cartridge can be commonly used for three steps of photographing, film processing and projection as in the previously mentioned cartridge. 90 are apertures for projection and for film processing while 91, 92 are film taken up and feed axles.

FIG. 15 to FIG. 21 are to show make-up of the photographing device, projection device, etc. to which the above mentioned cartridge having the notch claw 203 can be applied. They show especially each means to exercise such control as performing film processing action and projection by detecting presence or absence of the above mentioned claw.

The notch claw provided at the cartridge may be either of such type as can be notched by hand or of such structure as may be notched by a projection part 206 provided at a photographing device 201 such as a camera, etc. as shown by the two dots and a dash line in FIG. 12.

Figure 15:
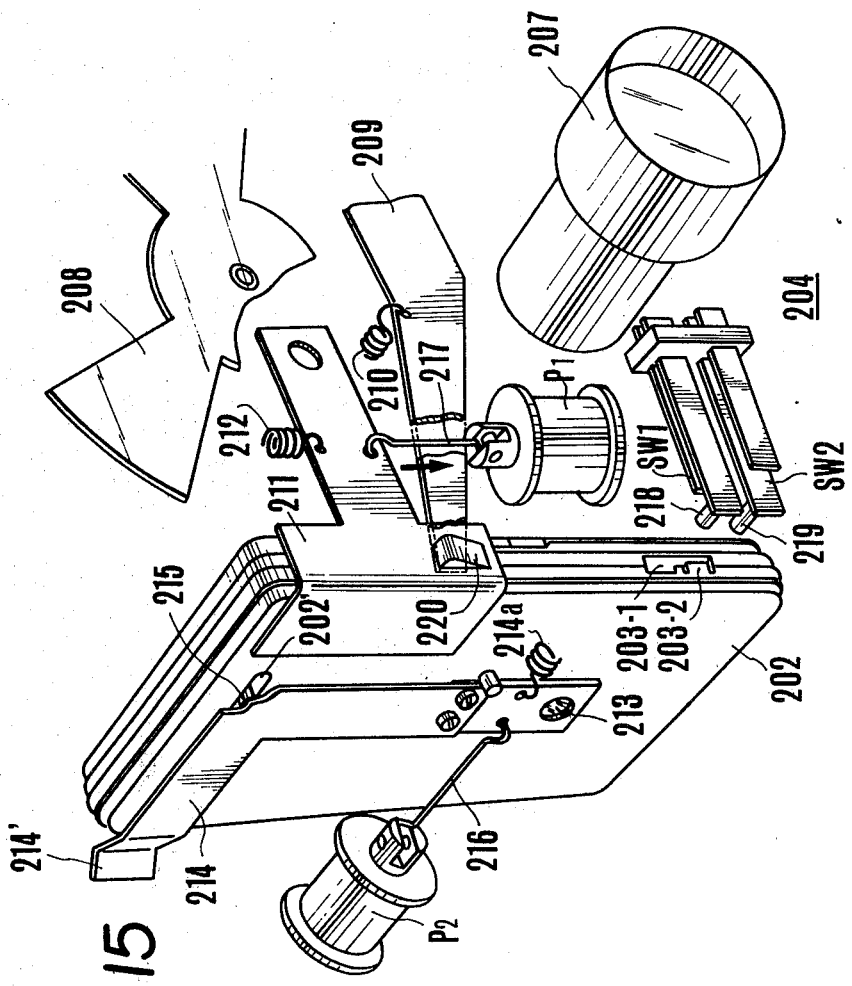
FIG. 15 is an oblique view showing the arrangement of important part of the motion picture projection device corresponding to FIG. 13.
Figure 16A:
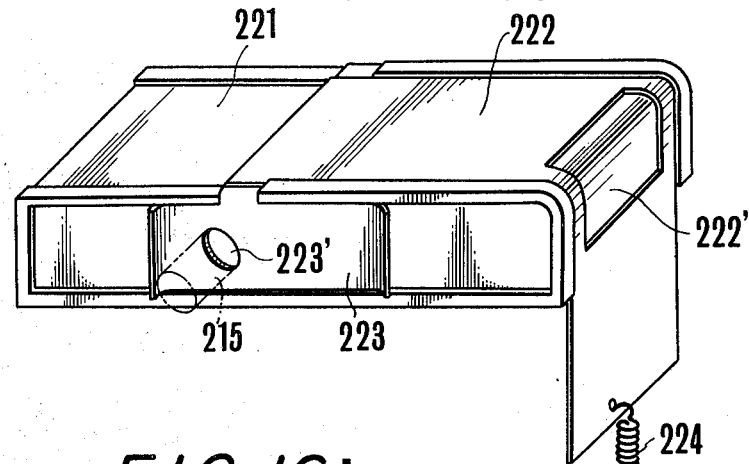
FIG. 16(a)(b) are enlarged oblique views of a means to control the coating of processing liquid for processing operation of the film cartridge shown in FIG. 15.
Figure 16B:
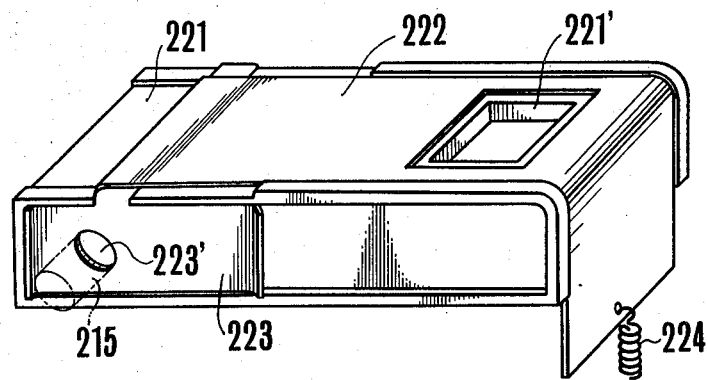

The cartridge 202, having its notch claw 203-1 notched at the time that it is mounted to a camera or after photographing is completed, is mounted to the projection device 204 as shown in FIG. 15. A pin 218 is provided at the switch SW1' provided at the position corresponding to said notch claw 203 for detecting presence or absence of said notch claw, and when the notch claw 203-1 is notched, the pin is inserted into its opening 203-1' and as shown in FIG. 19 its contact is closed. At the same time, the switch SW2' which is so provided as contacting with the notch claw 203-2 which indicates completion of film processing and has not been notched yet, comes in contact with the notch claw 203-2 with its detection pin 219 and is pushed, thus closing the contact in a similar manner. As the SW1', SW2' are closed in FIG. 19 as mentioned above, current goes through the circuit and as a result, the plungers $P_1$, $P_2$, $P_3$ are activated. As the plunger $P_3$ is placed in an active state the switch SWo for changing over the motor M in FIG. 20 to positive and negative direction is so changed over that the rotating direction of the motor will rewind the film (positive rotation → negative rotation).

Figure 17:
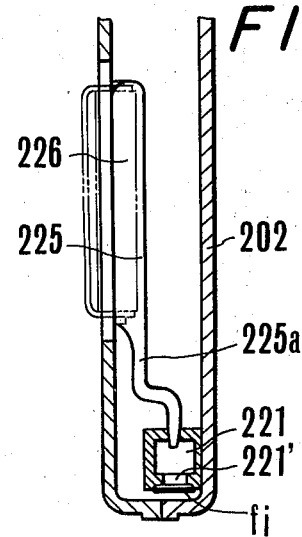
FIG. 17 is a partial cross sectional view of the inside of the film cartridge at the time when processing operation is done by the processing means shown in FIG. 15 and FIG. 16.
Figure 18:
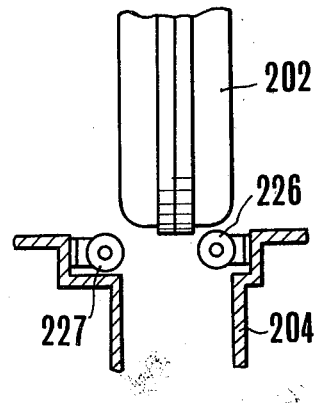
FIG. 18 is a partial cross sectional view of a state in which the film cartridge shown in FIG. 17 is inserted into the processing means.

Similarly as the plunger $P_1$ is attracted, as shown in FIG. 15, the light shielding member 211, which has been biased to clockwise direction by the spring 212, is rotated to counter clockwise direction through a connecting rod 217 to cover the above mentioned apertures 90 (refer to FIG. 13) for shielding light from the film being processed, and at the same time the film advancing claw 209 is evacuated from film running path by an inclined projection 220. The film cartridge 202 has, as shown in FIG. 17 and FIG. 18, a film processing liquid storage chamber 225 and a retention tank 221 within inside of the same, and they are so made that when the cartridge 202 is mounted to the projection device the film processing liquid storage chamber 225 is broken by the roller 226 so that the processing liquid is pushed out into the retention tank 221 through a tube 225a.

In FIG. 15, 207 is a conventionally known projecton lens while 208 is a rotating shutter. The retention tank 221 is made of a plate 223 which slides and a membrane 222 having a window 222' being provided to the plate 223 and is ordinarily pulled by a spring 224 to close an outlet 221' of the retention tank 221. On the other hand a pin 215 provided at a lever 214 which is biased to clockwise direction by a spring 214a (FIG. 15) is evacuated from the passage of the cartridge 202 when the cartridge is inserted by an inclination part 214' and at the same time when the insertion is completed it is inserted into a hole 223' of the slide plate 223 provided at the above mentioned retention tank 221 through a hole 202' perforated at the cartridge 202. And as current is sent to the motor driving circuit, as shown in FIG. 19, the plunger $P_2$ is pulled, therefore the lever 214 is rotated to counter clockwise direction using an axle 213 as a fulcrum through a connecting rod 216, then along therewith the slide plate 223 is moved by the pin 215 from the state of FIG. 16a to the state of FIG. 16b, while the window 222' exposes the outlet 221' of the film processing liquid storage tank to the film passage for having the processing liquid attach to the film fi thus processing is started. By notching the notch claw 203-2 of the cartridge 202 in which film processing is completed as above, the detection pin 219 of the switch SW2' shown in FIG. 19 is inserted into the notch hole 203-2', and the switch SW2 becomes OFF, while the driving motor M of the projection device 204 rotate said projection device 204 to projecting direction (positive rotating direction).

While the steps of photographing — film processing — projection of the film are completed as above, if the cartridge containing unexposed film is mounted in the projection device, the switch SW1' comes in contact with the notch claw 203-1 in FIG. 19 and the switch SW1' becomes OFF thus the driving circuit for the motor M is not formed and the projection device will not function, and the erroneous handling can be prevented. Also by notching the notch claw 203-1 after photographing, the projection device 204 in FIG. 19 is always set in film processing state as mentioned previously, further, by notching the notch claw 203-2 after film processing said projection device 204 is always set at the projection state. Also as providing a switch SW3' within the photographing driving circuit in the photographing device 201 in place of a projection part 206, as shown in FIG. 20, by notching the notch claw 203-1 after photographing, the photographing driving circuit becomes OFF even if said cartridge 202 is mounted again in the projecting device, thus error by the user can be prevented. While the plunger $P_3$ is used in FIG. 19 for changing over the projection device driving motor M for positive or negative rotation, it may be done by appropriate combination of a switch SW2'' as shown in FIG. 21. That is, the pin is made in a long shape pin 219' and contacts a to e are provided at the switch SW2'' so that the contacts a and c are connected at the time of positive rotation while the contacts b and d are connected at the time of negative rotation, to change the direction of current in the motor. FIG. 22 to FIG. 25 are to show an embodiment in which a sliding member 229 having a protruding part 229' is equipped at the cartridge 202 in place of the notch claws 203-1, 203-2.

In photographing state the protruding part 229' is located at the uppermost position in FIG. 22 and it is detected by a pin 230 to place the power source circuit of a photographing device in ON state by a switch SW4' thus photographing is done (FIG. 23a). When the cartridge containing unexposed film is mounted in the projection device 204, as the protruding part 229' is at the uppermost position the switch SW5 in the circuit similar to that in FIG. 19 becomes OFF and the projection device will not be driven (FIG. 23b).

Figure 27:
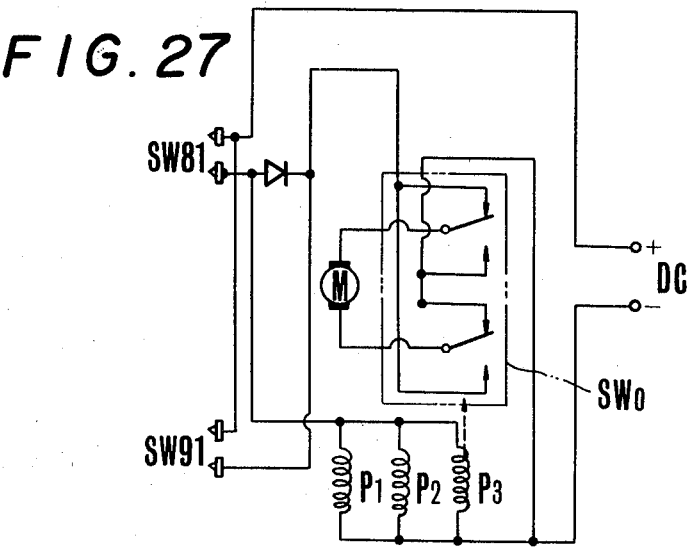
FIG. 27 is an electric circuit connection diagram to treat the output of the detection means shown in FIG. 26.

After photographing as the protruding part 229' is placed at the center and the cartridge is mounted in the projection device 204, the switches SW5' and SW6' become ON and the projection device 204 will be set at rewinding state for film processing as in the case of FIG. 19 (FIG. 23c). After film processing by positioning the protruding part 229' at the lowermost part the projection device 204 is always set at projecting state (FIG. 23d). Even if the cartridge 202 is mounted in the photographing device 201 (refer to FIG. 12) while the protruding part 229' is located at a center or at a lowermost position, the power source circuit of the photographing device will be left opened and will not function as the switch SW4' shown in FIG. 23a becomes OFF, thus erroneous handling can be prevented. Also to satisfy the requirement for preventing processing or projection of unexposed film only, a protruding part 233 may be provided at the projection device 204 in place of a switch so that the cartridge containing unexposed film can not be mounted in the projection device 204 (FIG. 24). In FIG. 25, FIG. 26a to d an electroconductive member 235 is provided at a sliding member 234 which corresponds to the above mentioned sliding member 229 to effect same function as above, while their circuit is shown in FIG. 27. This circuit is of virtually same characteristics as what is shown in FIG. 19, wherein same components are identified with same numbers or codes and explanations thereof will be omitted. Each of the switches SW7', SW8', SW9' shown in FIG. 26a to d has such function as corresponding to that of the switches SW3', SW1', SW2' shown in FIG. 19 and FIG. 20 and the operation thereof is same, thus explanations thereof will be omitted.

Figure 25:
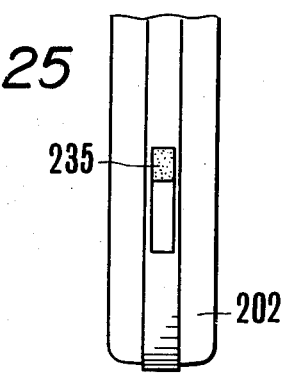
FIG. 25 is a partial side elevation to show a modified example of the film cartridge shown in FIG. 22.
Figure 26A:
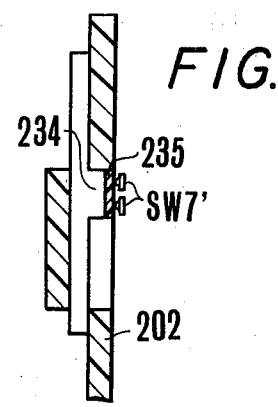
FIG. 26(a) to (d) are front elevations of a means to detect the identification signal of the film cartridge shown in FIG. 25 in various manner.
Figures 26B, 26C, 26D:
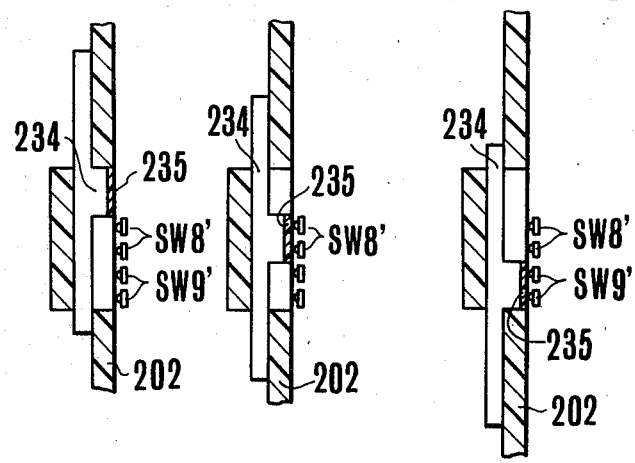
Figure 28:
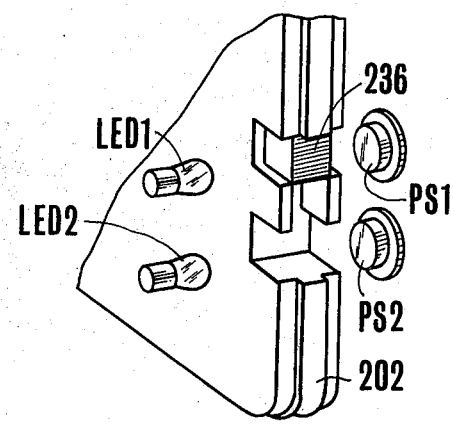
FIG. 28 is a oblique view to show a film cartridge which is further another modification example of the film cartridge shown in FIG. 22 and FIG. 25, an identification signal providing means provided therein and its detection means.
Figure 29A:
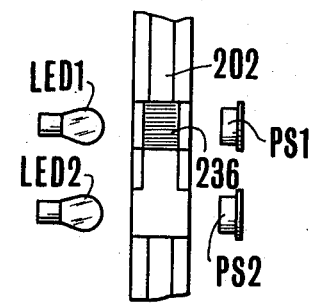
FIG. 29(a) to (c) show side elevations showing functional manners of the identification signal detection means which can be applied to the film cartridge shown in FIG. 28.
Figure 29B:
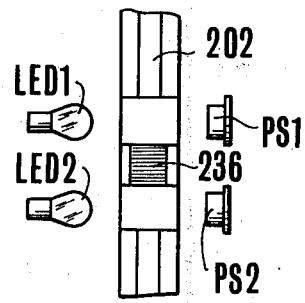
Figure 29C:
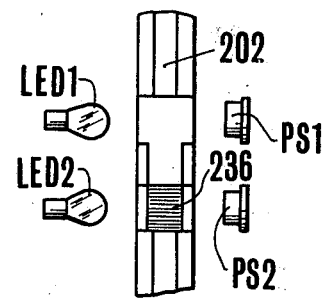
Figure 30:
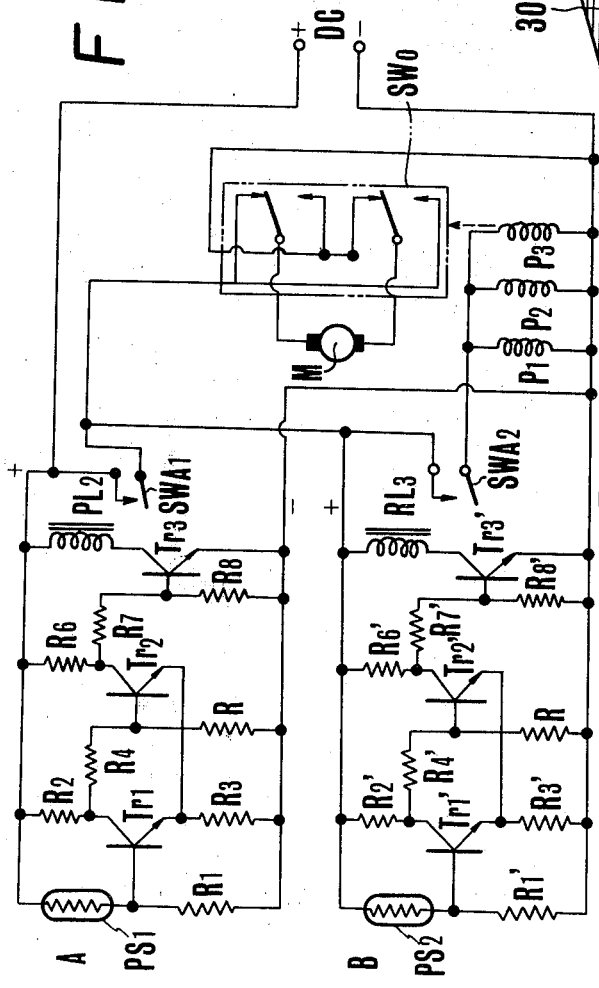
FIG. 30 is a circuit diagram to show an example of an electric circuit connection to treat the output of the detection means shown in FIG. 29.

FIG. 28 to FIG. 30 show an embodiment which employs a photo-electric switch, which has same function as what is shown in FIG. 25 and FIG. 26 but is made of a combination of lamps LED1, LED2 and photo-detection elements PS1, PS2 provided in such manner that the sliding member 236 of the cartridge is sandwitched between said lamps and the elements, in place of mechanical switches. And the circuit used therefor is shown in FIG. 30.

[Explanation of function of the circuit (FIG. 30)]:

In this circuit, for example the point in group A which is divided by the photo-detection element PS1 (for example photo-conductive element CdS) and the resistance $R_1$ is connected to a Schmidt circuit being made pf transistors $Tr_1$, $Tr_2$, $Tr_3$, and resistances $R_2$, $R_3$, $R_4$, $R_5$, $R_6$. The collector of the transistor $Tr_2$ of the Schmidt circuit is connected to the base of the relay — $RL_2$ — driving-transistor $Tr_3$ through the resistances $R_7$, $R_8$. Also the photo-detection element $PS_2$ in group B activates the relay $RL_3$ by same arrangement as the above circuit (each of the corresponding elements are identified by adding dash). Each of the photo-detection elements in groups A and B is illuminated by an illuminant element for example an illuminant diode LED corresponding to the casset of the information source 202. For instance, in the state of FIG. 29a, the photo-detection element PS1 has its illuminating light cut off by a movable light shielding member 236, and the bleeder voltage of PS1 and $R_1$, that is the base potential of the transistor $Tr_1$ will become lower than the activating voltage of the Schmidt circuit in the group A, thus the relay $RL_2$ will not function. As the relay switch SWA1 is OFF at this the motor will not be activated, and at this state the Schmidt circuit in the group A only works while the Schmidt circuit in the group B does not work. Therefore, power source is not supplied. Next, in the state of FIG. 29b, both the photo-detection elements PS1, PS2 are illuminated and has low resistance and both of the relays RL2, RL3 work thus the motor makes inverse rotation. Next, in the case of FIG. 29c, the PS1 has low resistance and the Schmidt circuit in the group A only works, thus the motor makes normal rotation. As other circuit elements are same as in FIG. 19, explanations thereof will be omitted.

Figure 31:
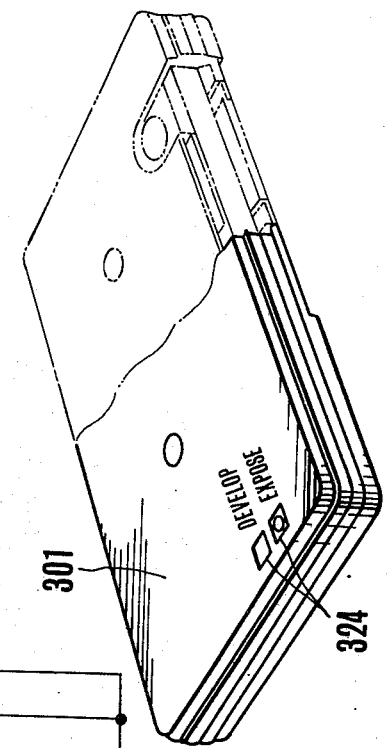
FIG. 31 is a partial oblique view of another film cartridge provided with an information signal providing part.

FIG. 31 is a partial oblique view to show another embodiment of such film cartridge which can be applied to the film handling system of the present invention. In the drawing, 301 is a film cartridge housing, 324 shows an information indication means in each step of exposure, film processing, projection, and this means is made of such substance as printing letters, codes, etc. as heat or pressure is applied thereto. For example, the indication of completion of photographing and indication of completion of film processing can be done on the cartridge, wherein such substances as conventionally known heat-sensitive material, thermosensitive material and pressure-sensitive material is coated on a portion of the outer wall of the cartridge as shown in the drawing. It is better to provide plural number of such information indication parts so that each of the same indicate whether exposure is completed or not, whether film processing is finished or not. And when no printing exists in one of said indication parts it shows a roll of unexposed film that is the film before photographing and when no printing exists in next indication part it means the film before processing. It is convenient to provide such letters as EXPOSE, DEVELOP, etc. at the positions of such indication parts to distinguish the plural number of the indication parts.

Figure 32:
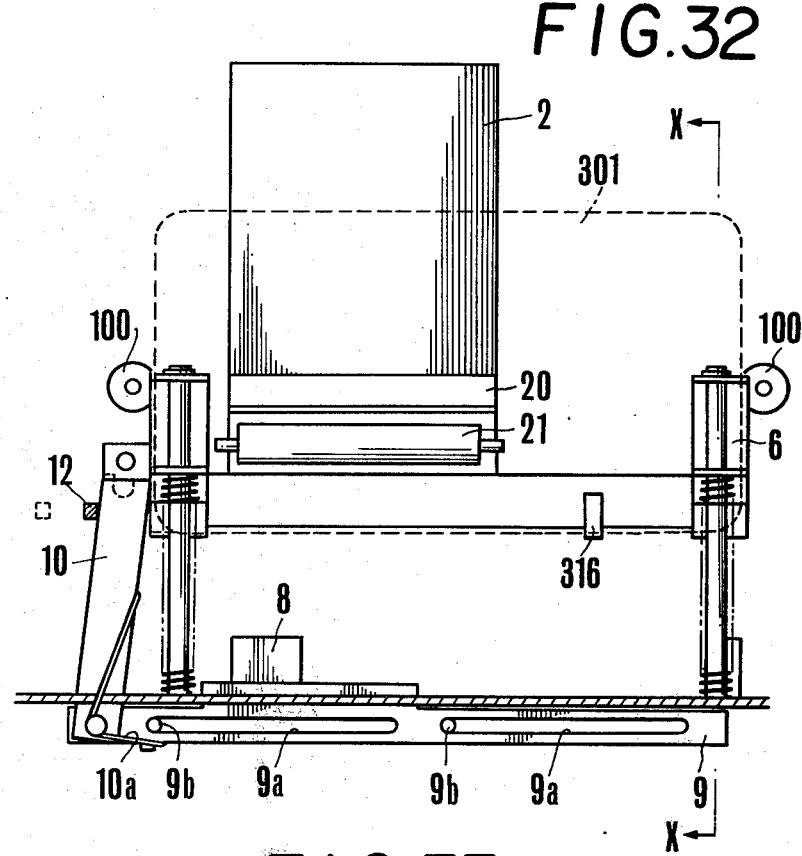
FIG. 32 is a front elevation of one pattern of the film handling system in which the film cartridge is mounted and processing operation can be done.
Figure 33:
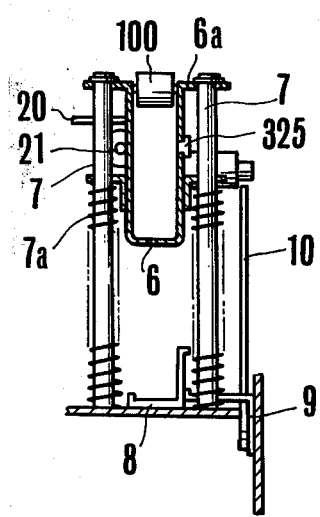
FIG. 33 is a cross-sectional view of the handling system shown in FIG. 32 which is sectioned along the line X — X and viewed in the direction of arrow.

FIG. 32 and FIG. 33 are to show a projection device into which the film cartridge shown in FIG. 31 is mounted, wherein similar elements as those in the projection device shown in FIGS. 4, 5, 6 and completely corresponding thereto are identified with same numbers and codes and explanations thereof will be omitted. 325 shows a heating member (refer to FIG. 33) and the position at which it is placed corresponds to the position where a heat-sensitive indication part 324 provided on the cartridge 301 indicates the completion of film processing. Also a switch 316 is provided at a position opposite to the position at which the heating member 325 of the cartridge housing frame 6 is provided, to detect whether the cartridge 301 is housed in the housing frame 6 by said switch 316.

FIG. 34 is an electric circuit connection diagram which can be applied to the device shown in FIG. 32 and FIG. 33, and same elements as in the circuit diagram of FIG. 8 are identified with same numbers and codes and explanations thereof will be omitted.

SW1 is a mode switch which also serves as a main switch, and the contact a of the SW1 is changed over to film processing contact, and the contact b thereof is changed over to off contact while the contact c to projection. SW2, SW3 are provided coaxially with the mode switch SW1 and are changed over simultaneously therewith. They are the switches to change over positive - negative of the motor M and to light or put out the projection lamp $L_1$ and the indication lamp $L_2$. The SW4 is a cartridge detection switch 16 and becomes ON as the cartridge is placed in the housing frame 6. When the mode switch SW1 is placed in the contact a, the SW2, SW3 also are placed in contact 1, and as the SW4 is closed the circuit is closed to rotate the motor M inversely flowing current to the heating member 325. By this the heat-sensitive member at the indication part is printed and as the cartridge is demounted after film processing the user will notice that the film in the cartridge has processing completed thereon.

Next, explanations will be made on the method of printing and means thereof for the cartridge on which pressure-sensitive material is attached referring to FIG. 35 and FIG. 36.

First method of printing on the casset on which pressure-sensitive material is attached will be explained. A pressure-giving member 326 is so provided as it can be freely rotated on the casset housing frame 6 and a pin 327 is provided on said member 326 so that pressure can be applied on a position on a pressure-sensitive member 324 on the casset to indicate completion of film processing by rotation. There is a pressure giving bar 328 at the main body side and as the cartridge is placed in the housing frame 6 and is pressed down the pressure-giving member 326 comes in contact with the pressure-giving bar 328 to rotate the pin 327 to the direction of the casset to give pressure to the pressure-sensitive member.

Of course heating and pressure-giving devices are provided at a camera which is not shown in the drawings so that as the casset is mounted printing can be done on the heat-sensitive or pressure-sensitive member at the position to indicate completion of photographing.

As has been explained above in the present invention, a film processing device with such safety device can be provided that a means is provided in the handling system of film to detect identification signals provided on a film cartridge or identification signals provided on such part of the film as other than image recording portion, and by its output film processing is allowed in the processing step when the film has exposure completed thereon while when the film is unexposed or has processing completed thereon the film processing in the processing step can be automatically prevented, thus the invention has such advantages as providing great convenience in handling.

Also such safety device is provided that by the output of said detection means projection in the projection step is allowed when the film has processing completed thereon while the projection operation is automatically prevented when the film is unexposed or unprocessed, thereby it provides such remarkable effect that erroneous projection can be completely prevented when a common film cartridge is used and the film is processed immediately after photographing and is subsequently subjected to projection step.

The present invention also provides a film handling system in which such film cartridge can be used as being commonly used in each step of photographing and film processing and as having information indication means provided with such information as corresponding to the state of completion of photographing on the film and to the state of completion of processing thereon. Said information indication means can be formed by (a) mechanically position-shifting member having its position changed between the photographing step and the film processing step of the film, or (b) indication members consisting of such sensitive material as against pressure or heat, etc. By this when such film cartridge is commonly used and is instantly applied to each step of exposure, processing and projection, erroneous handling can be effectively prevented. Thus a film handling system in which a film cartridge with excellent handling characteristics can be used may be provided.

What is claimed is:

1. A film handling system for use with a film cartridge housing a strip of film, comprising:
   a first means for selectively activating said film cartridge for placing said film in a state allowing exposure;
   a second means for selectively activating said film cartridge for placing said film in a state allowing processing; and
   a third means for selectively activating said film cartridge for placing said film in a state allowing projection;
   wherein said film cartridge is used sequentially by said first, second and third means in the recited order, said cartridge comprising:
   a housing;
   a processing means positioned within said housing to process said film, which is selectively activated by said second means and includes processing liquid to process said film, and a processing liquid, receiving the activating force of said second means so that said processing liquid can be selectively supplied to a film surface; and
   an indication means to indicate which one of the said first, second and third means through which said film has passed, wherein said indication means is shiftable in turn to a first position to indicate that said film has not yet passed through the first means, a second position to indicate that the same film has passed through the first means, and a third position to indicate that it has passed through the second means; and
   a control means included in said system for detecting said indication means for controlling the action of said first, second, and third means, wherein said control means detects the position at which said indication means is placed when said film cartridge is mounted into said system to control the advancing and stopping of the film cartridge so that it proceeds through each step in a prescribed order.

2. A system according to claim 1, wherein said indication means comprises a member attached to a part of said film cartridge so as to be externally accessible and is shifted in turn to said positions each time one step of the film handling procedures is completed.

3. A system according to claim 2, in which said indication means includes an identification signal providing part being attached to a part of said film cartridge so as to be visible from outside the cartridge to indicate the state of the film handling process.

4. A system according to claim 2, wherein indication means comprises an identification signal providing part allowing, by heating, the indication of the state of the film handling procedure to be indicated at a part of said cartridge.

5. A system according to claim 1, wherein said control means includes means for detecting the position of said indication means photoelectrically.

6. A film handling system for use with a film cartridge housing a strip of film, comprising:
   a first means for selectively activating said film cartridge for placing said film in a state allowing exposure;
   a second means selectively activating said film cartridge for placing said film in a state to allow processing;
   a third means for selectively activating said film cartridge for placing said film in a state allowing projection;
   said film cartridge which is used commonly through said first, second and third means consecutively in said order, comprising:
   a housing,
   a processing means positioned within said housing to process said film and being selectively activated by operation of said second means, and including processing liquid to process said film, and a processing liquid storage means to store said processing
   liquid, receiving the activating force of said second means so that said processing liquid can be selectively supplied to a film surface;
   an indication means for indicating which one of said first and second means said film has passed through, wherein said indication means can be shifted in turn to a first position to indicate that said film has not yet passed through the first means, a second position to indicate that the film has passed through the first means, and a third position to indicate that the film has passed through the second means; and
   a blocking means for blocking the function of the said second means from operating said processing liquid storage means when said indication means is in said first position; and
   a control means included in said system for controlling the action of said first, second and third means, wherein said control means detects the position at which said indication means is placed as said film cartridge is mounted within said system to control the advancing and stopping of said film cartridge so that it completes each step controlled by said first, second and third means in a prescribed order.

7. A system according to claim 6, wherein said indication means comprises a member attached to a part of said film cartridge so as to be externally accessible, which member is shiftable in turn to said positions each time one of the steps controlled by said first, second and third means is completed.

8. A system according to claim 7, wherein said indication means comprises an identification signal providing means attached to a part of said film cartridge in a manner which is visible from outside the cartridge to indicate the film handling state.

9. A system according to claim 7, wherein said indication means comprises an identification signal providing a part for indicating, by heating, the film handling state of the film housed in said film cartridge so as to be indicated at a part of said cartridge.

10. A system according to claim 6, wherein said control means comprises a means for detecting the position of said indication means photoelectrically.

11. A system according to claim 6, wherein said blocking means includes a release means for automatically releasing its blocking function when said indication means is shifted to the positions other than said position allowing exposure.

12. A system according to claim 6, wherein said blocking means includes a slide member which constitutes a portion of said housing adapted to slide on said housing, said blocking member also capable of bringing said processing liquid storage means to a position outside of said housing by sliding.

13. A system according to claim 12, wherein said second means includes a member for providing external pressure to said processing liquid storage means selectively when said processing liquid storage means is brought to a position outside of the housing.

14. A film handling system for use with a film cartridge housing a strip of film, comprising:
a first means for selectively activating said film cartridge for placing said film in a state allowing exposure;
a second means for selectively activating said film cartridge for placing said film in a state allowing processing;
a third means for selectively activating said film cartridge for placing said film in a state allowing projection;
said film cartridge, which is used for said first, second and third means in turn, comprising:
a housing;
a processing means positioned within said housing to process said film, being selectively activated by operation of said second means, and including processing liquid to process said film; and
a processing liquid storage means to store said processing liquid, wherein said means receives the activating force of said second means and for bringing said processing liquid selectively to a surface of said film; and
an indication means for indicating which of said first, second and third means said film has passed through, wherein said indication means includes a first removable part to indicate that said film has not yet passed through said first means, a second removable part to indicate that the film has passed through the first means, and a third removable part to indicate that the film has passed through the second means, wherein, as said film cartridge is mounted in said system and any one of said first, second and third means is activated, each of said removable parts corresponding to said means can be removed in association with said activation; and
a control means for controlling said first, second and third means, wherein said control means detects the state of removal of said indication means and the position thereof as the film cartridge is mounted within said system, to control the advancing and stopping of said film cartridge so that it completes each step controlled by said first, second and third means in a prescribed order.

15. A system according to claim 14, wherein said control means includes a switching means having the opening and closing of said switching means controlled by the presence or absence of said removable parts as said film cartridge is mounted within said system, wherein said switching means includes a plural number of shorting switching members which are coupled to said first, second and third means, forming pairs therewith.

16. A film handling system for use with a film cartridge housing a strip of film, comprising:
a film cartridge which is used commonly in each step of exposure, processing and projection, and including:
a housing;
a processing means positioned within said housing to process said film, including processing liquid to process said film, and a processing liquid storage means to store said processing liquid, wherein said storage means is adapted selectively to supply said processing liquid to a surface of said film; and
an indication means to indicate which one of said exposure and processing steps the film has passed through, wherein said indication means is shiftable in turn to a first position for indicating that the film has not yet passed through the exposure step, a second position to indicate that the film has passed through the exposure step, and a third position to indicate that the film has passed through the processing step;
a photographing device which allows loading of said film cartridge and exposes and records image information on said film, and including:
a driving means for said photographing device for activating said device; and
a control means for detecting the shifted position of said indication means to control the driving and the stopping of said driving means when said indication means is placed at said first position; and
a processing projection means which allows loading of said film cartridge and is adapted to conduct processing and projection steps of the film, including:
a processing projection driving means for activating said device, wherein said driving means drives selectively in a processing mode and a projection mode;
a mode changing means for changing the driving mode of the processing projection driving means;
means to provide a processing liquid supplying function to said processing liquid storage means during the processing mode; and
a control means for detecting the shifted position of said indication means of the loaded film cartridge and for controlling said mode changing means;
wherein the advancing and stopping of the film cartridge is controlled so that the cartridge proceeds through the said steps in a prescribed order.

17. A system according to claim 16, wherein said indication means comprises a member attached to a part of said film cartridge so as to be accessible externally, said member to be shifted in turn to a respective position every time a corresponding step of the film handling procedure is completed.

18. A system according to claim 17, wherein said indication means comprises an identification providing part attached to a part of said film cartridge to indicate the state of the film handling procedure.

19. A system according to claim 17, wherein said indication means includes an identification providing part allowing, by heating, indication of the state of film handling steps at a part of said cartridge.

20. A system according to claim 16, wherein the control means of said processing projection device includes a means for detecting the position of the said indication means photoelectrically.

21. A system according to claim 16, wherein said processing projection driving means includes means to selectively run the said film in a forward or reverse direction.

22. A system according to claim 16, wherein said processing projection driving means includes a film running means to run said film, wherein said running means can be changed to a mode to run said film intermittently and to a mode to run the film continuously in association with said mode changing means.

23. A system according to claim 16, wherein said processing projection driving means comprises a member to shield the exposure opening of said film cartridge during said processing mode.

24. A film handling system for use with a film cartridge housing a strip of film, comprising:
a film cartridge which is used commonly for each step of exposure, processing, and projection, comprising:
   a housing;
   a processing means positioned within said housing to process said film, and including processing liquid to process said film, and a processing liquid storage means to store
   said processing liquid, wherein said storage means selectively supplies said processing liquid to a surface of said film; and
   an indication means for indicating which one of said exposure and processing steps the film has passed through, wherein said indication means is shiftable in turn to a first position to indicate that said film has not yet passed through exposure step, a second position to indicate that the film has passed through an exposure step and a third position to indicate that the film has passed through a processing step;
an exposure processing device for allowing the loading of said film cartridge and also allowing the operations of exposure and processing steps of said film, comprising:
   an exposure processing device driving means for activating said device, wherein said means selectively drives in an exposure mode and in a processing mode;
   a mode changing means for changing the driving mode of said exposure processing device driving means;
   means to provide a processing liquid providing function to said processing liquid storage means during said processing mode; and
   a control means for detecting the shifted positions of said indication means of said loaded film cartridge to control said mode changing means; and
a projection device allowing loading of said film cartridge and also allowing projection operation of said film, comprising:
   a driving means for a projection device for activating said device; and
   a control means for detecting the shifted positions of said indication means of the loaded film cartridge to control the driving and stopping of said driving means for the projection device, wherein said control means drives said projection driving means when said indication means is placed at said third position;
whereby the advancing and stopping of said film cartridge is controlled so that said cartridge will complete each step in a prescribed order.

25. A film handling system for use with a film cartridge housing a strip of film, comprising:
a film cartridge used commonly in each step of exposure, processing, projection, comprising:
   a housing;
   a processing means positioned within said housing to process said film, including processing liquid to process said film, and a processing liquid storage means to store said processing liquid, wherein said means selectively supplies said processing liquid to a film surface;
   an indication means for indicating which one of said exposure and processing steps the film has passed through, wherein said means is shiftable in turn to a first position to indicate that said film has not yet passed through the exposure step, a second position to indicate that the film has passed through the exposure step, and a third position to indicate that the film has passed through the processing step; and
   a blocking means to prevent the supply of said processing liquid to said film surface when said indication means is at said first position;
a photographing device for allowing loading of said film cartridge and for exposing and recording image information on said film, including:
   a driving means for a photographing device for activating said device; and
   a control means for detecting the shifted position of said indication means of the loaded film cartridge to control driving and stopping of said driving means, wherein said control means drives said driving means when the indication means is placed in said first position; and
a processing projection device for allowing loading of said film cartridge and for conducting the processing and projection steps of said film, including:
   a driving means for activating said processing and projection device, wherein said means can be driven selectively in a processing mode and in a projection mode;
   a mode changing means for changing the driving mode of said processing projection driving means;
   means to provide a processing liquid supply function to said processing liquid storage means during said processing mode; and
   a control means for detecting the shifted position of said indication means of said loaded film cartridge to control said mode changing means;
whereby the advancing and stopping of the film cartridge functions to complete each of said steps in a prescribed sequence.

26. A system according to claim 25, wherein said indication means comprises a member attached to a part of said film cartridge so as to be externally accessible and to be shifted in turn to said positions every time a corresponding step of the film handling procedure is completed.

27. A system according to claim 26, wherein said indication means comprises an identification signal providing means which is attached to a part of said film cartridge so as to be visible externally to indicate the state of the film handling procedure.

28. A system according to claim 26, wherein said indication means comprises an identification signal providing part for indicating, by heating, the state of the film handling procedure step of the film housed in said film cartridge at a part of said cartridge.

29. A system according to claim 26, wherein said control means of said processing projection device includes means for detecting the positions of said indication means photoelectrically.

30. A system according to claim 25, wherein said driving means for processing and projection comprises a film running means to run said film, wherein said running means can be changed to a mode to intermittently run said film and a mode to continuously run said film in association with said mode changing means.

31. A system according to claim 25, wherein said driving means for processing and projection includes a member to shield the exposure opening of said film cartridge during the processing mode.

32. A system according to claim 25, wherein said blocking means includes a release means to release the blocking function of said indication means automatically when said indication means is shifted to positions other than said first position.

33. A system according to claim 25, wherein said blocking means includes a slide member adapted to slide on said housing and for bringing the processing liquid storage means outside of said housing by sliding.

34. A film handling system for use with a film cartridge housing a strip of film, comprising:
 a film cartridge which is used commonly for each step of exposure, processing and projection, and including:
  a housing;
  a processing means positioned within said housing to process said film, and including processing liquid to process said film, and a processing liquid storage means to store said processing liquid, wherein said means selectively supplies said processing liquid to a film surface; and an indication means for indicating which one of the steps of exposure and processing the film has passed through, wherein said means can be shifted in turn to a first position to indicate that said film has not yet passed through the exposure step, a second position to indicate that the film has passed through the exposure step and a third position to indicate that the film has passed through the processing step;
 an exposure processing device which allows loading of said film cartridge to conduct exposure processing steps of said film, and including:
  a driving means for an exposure processing device to activate said device, said means for being selectively driven in an exposure mode and in a processing mode;
  a mode changing means to change the mode of the driving means for exposure and processing;
  means for providing a processing liquid supply function to said processing liquid storage means during the processing mode; and
  a control means for detecting the shifted positions of said indication means of said loaded film cartridge to control said mode changing means; and
 a projection device allowing the loading of said film cartridge and for conducting the projection step of said film, including:
  a driving means for the projection device for activating said device; and
  a control means for detecting the shifted positions of said indication means of said loaded film cartridge to control the driving and stopping of said driving means for the projection device, wherein said control means drives said driving means for the projection device when said indication means is placed in said third position;
 whereby the advancing and stopping of said film cartridge is controlled so that said film cartridge completes each step in a prescribed order.

35. A film cartridge for use in a film handling system encompassing the film handling steps of exposure, processing and projecting, comprising:
 a housing;
 a strip of film disposed in said housing;
 a processing means to process said film, including processing liquid, and a processing liquid storage means to store said processing liquid, wherein said means selectively receives activating force from outside of the housing and is adapted to supply said processing liquid to a surface of said film;
 an indication means to indicate which one of said exposure and processing steps the film has passed through, wherein said means is shiftable to a first position to indicate that said film has not yet passed through an exposure step, a second position to indicate that the film has passed through the exposure step, and a third position to indicate the film has passed through the processing step; and
 a blocking means to block an external force for operating said processing liquid storage means when said indication means is in said first position;
 wherein the position at which said indication means is placed is shifted for each step and the cartridge is used sequentially for each step of exposure, processing and projection.

36. A system according to claim 35, wherein said blocking means includes a slide member which constitutes a part of said housing and is adapted to slide on said housing, said slide members also bringing the processing liquid storage means outside of said housing by sliding.

* * * * *